US006942279B1

(12) United States Patent
Hoover

(10) Patent No.: US 6,942,279 B1
(45) Date of Patent: Sep. 13, 2005

(54) CAMPER SHELL APPARATUS FOR TRUCKS

(76) Inventor: Richard Hoover, 5928 E. Dynamite Blvd., Cave Creek, AZ (US) 85331

( * ) Notice: Subject to any disclaimer, the term of this patent is extended or adjusted under 35 U.S.C. 154(b) by 0 days.

(21) Appl. No.: 10/878,920

(22) Filed: Jun. 28, 2004

(51) Int. Cl.$^7$ ................................................. B60P 3/345
(52) U.S. Cl. .................. 296/159; 296/165; 296/26.04; 296/100.18; 135/88.05; 135/88.13
(58) Field of Search ............................. 296/26.04, 156, 296/159, 160, 164, 165, 100.16, 100.17, 296/100.18; 135/88.01, 88.05, 88.09, 88.13, 135/88.15

(56) References Cited

U.S. PATENT DOCUMENTS 3,354,891 A * 11/1967 Brown .................... 135/88.09
4,332,265 A * 6/1982 Baker ......................... 296/159
4,738,274 A * 4/1988 Heath ......................... 135/137
5,353,826 A * 10/1994 Davis, Sr. ................ 135/88.13
6,616,212 B1 * 9/2003 Bishop ................... 296/100.18

* cited by examiner

Primary Examiner—Dennis H. Pedder
(74) Attorney, Agent, or Firm—Craig Weiss; Jeffrey Weiss; Weiss, Moy & Harris, P.C.

(57) ABSTRACT

An improved camper shell that is collapsible and portable. The shell consists of a cover that is positioned over a shell frame. The shell frame is formed by a plurality of components, preferably formed of steel, that are fitted together for use and that may be stored within the cover when not in use. The main frame components include bottom supports, vertical supports coupled thereto, and cross-members. Preferably, the bottom supports and cross-members are adjustable in length, to fit a plurality of truck bed sizes. The frame preferably angles downward from rear to front, for drainage and other purposes.

20 Claims, 13 Drawing Sheets

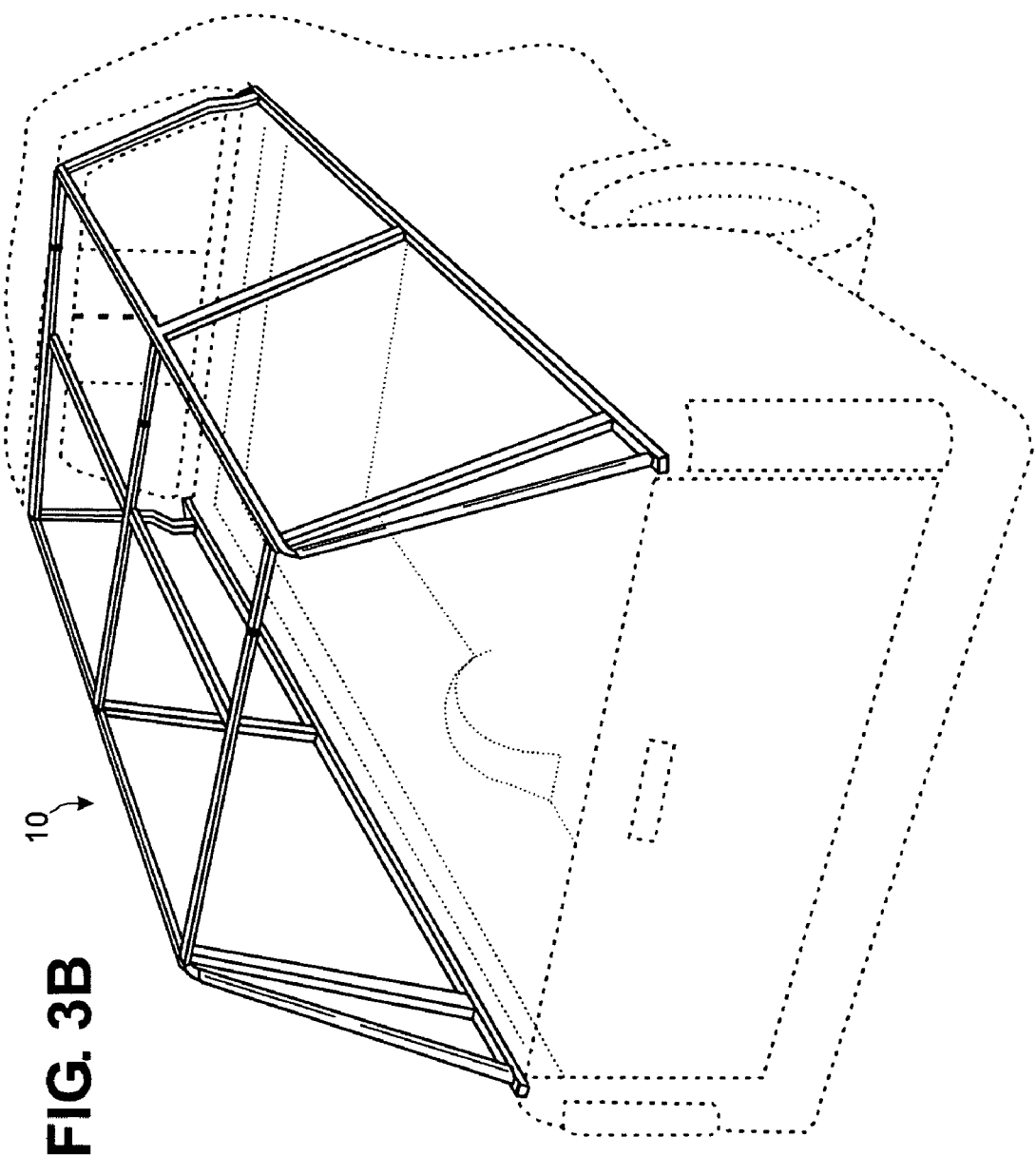

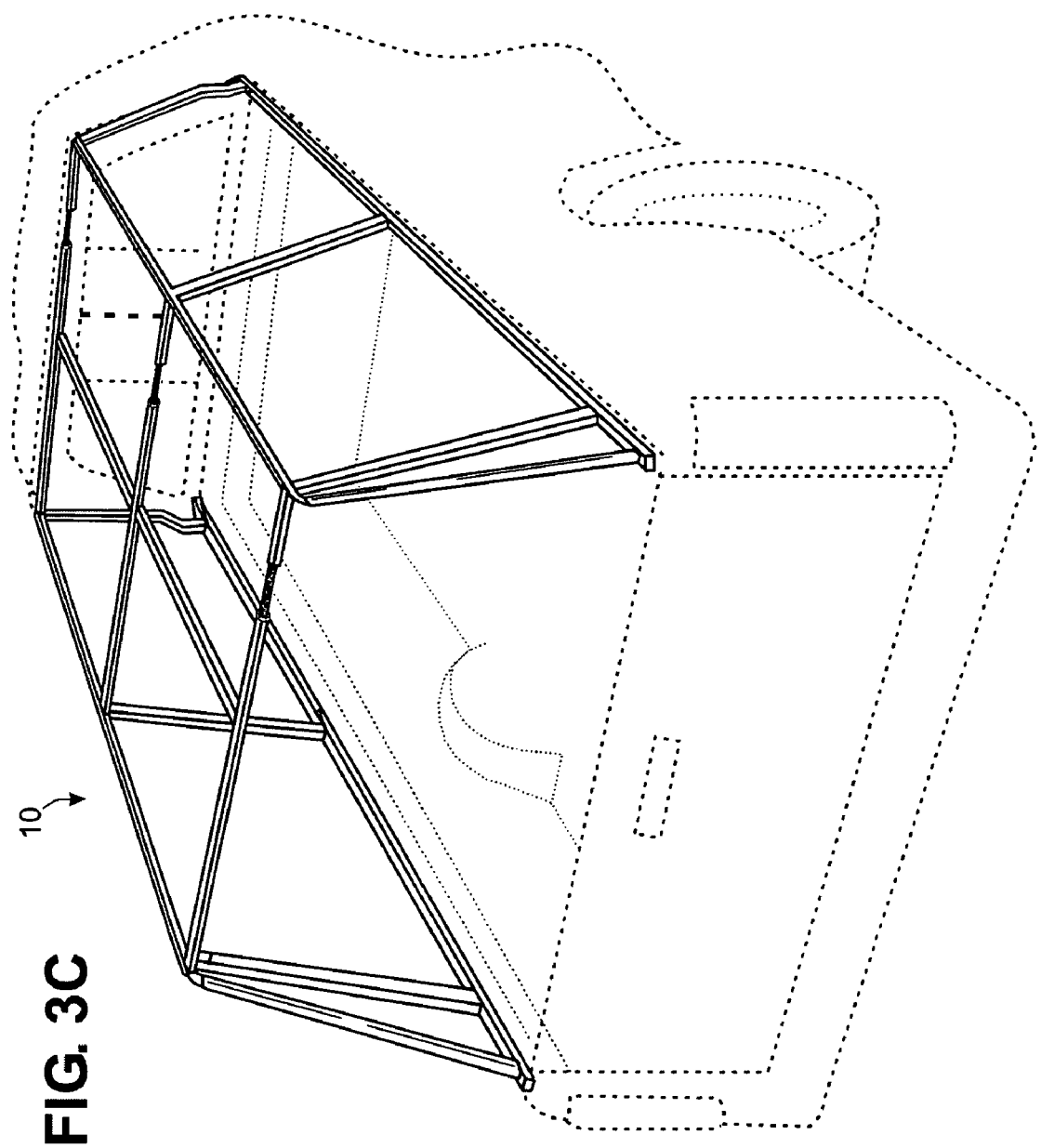

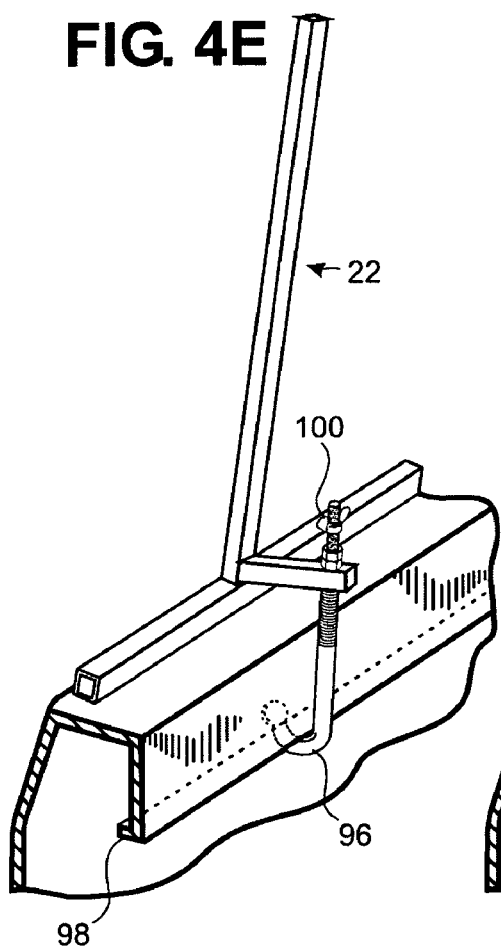
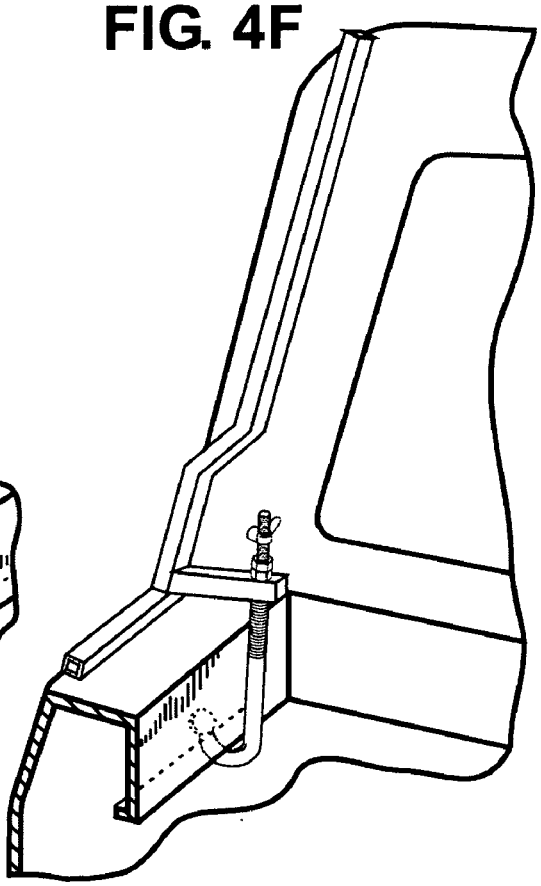
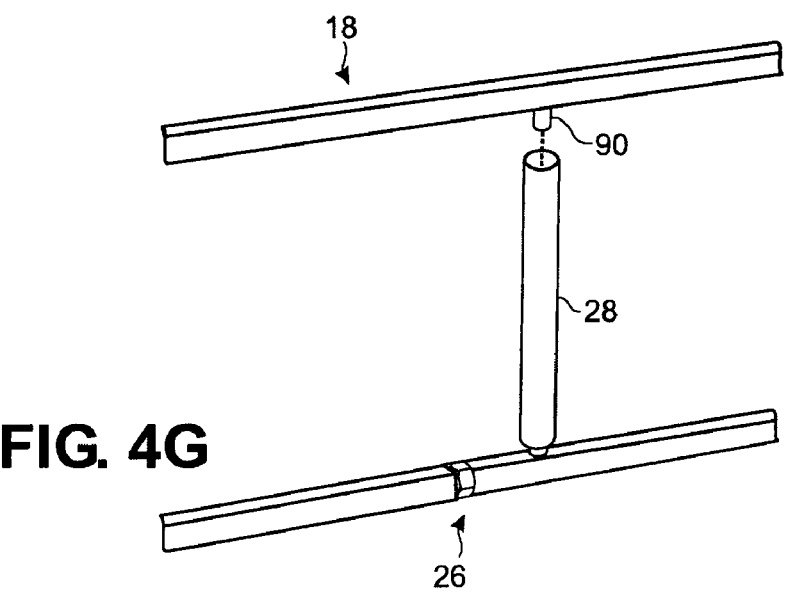

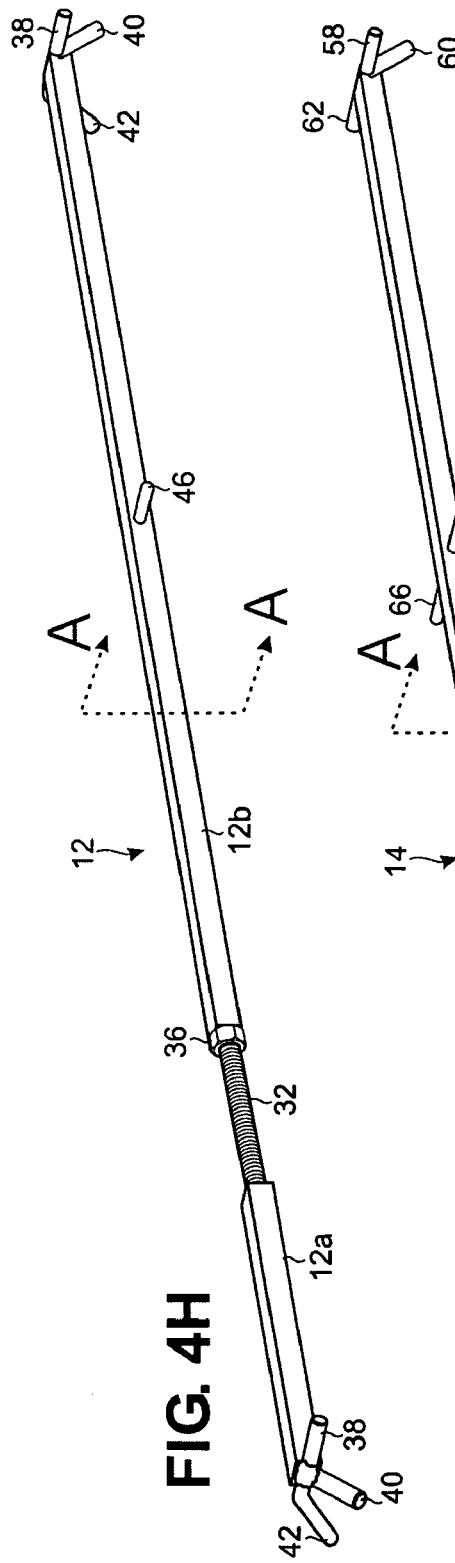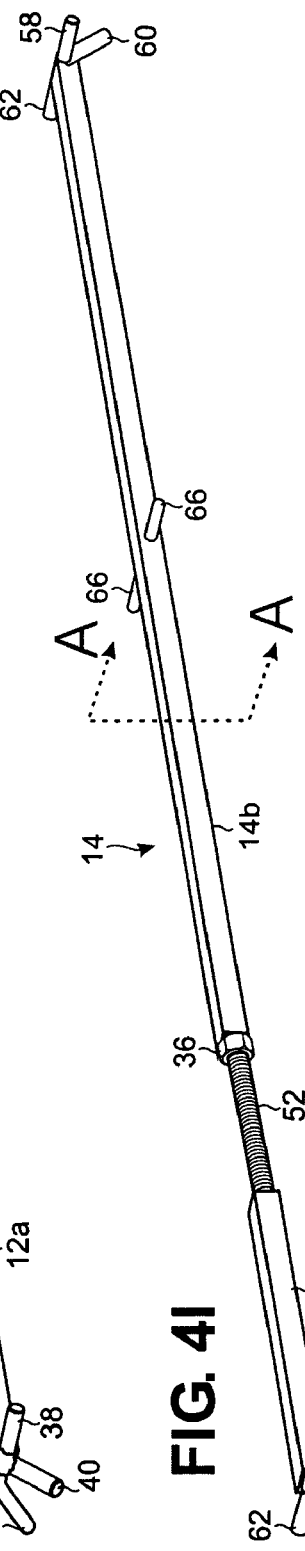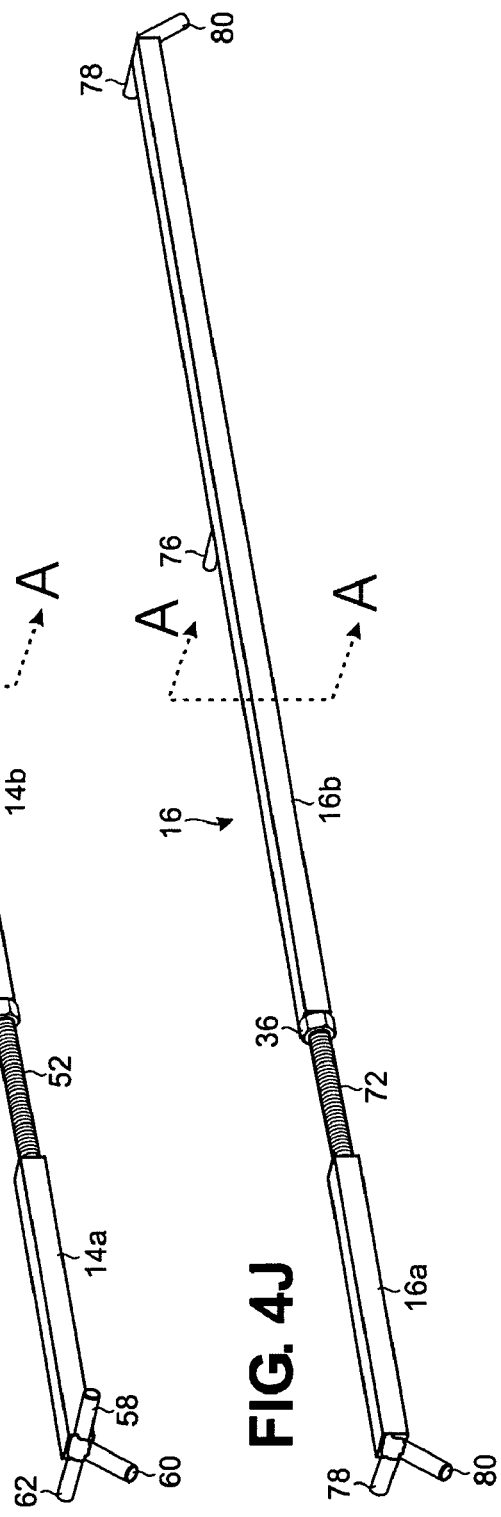

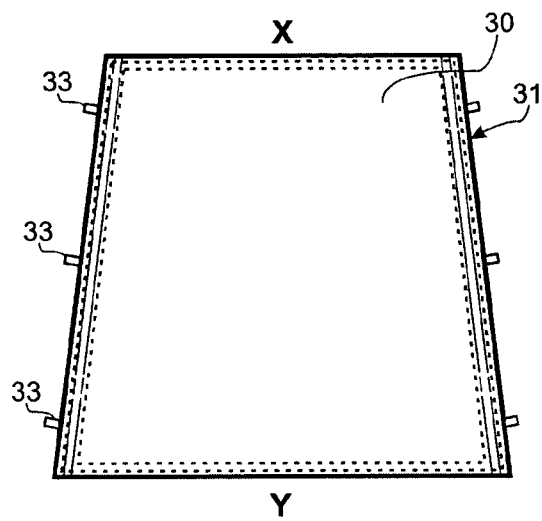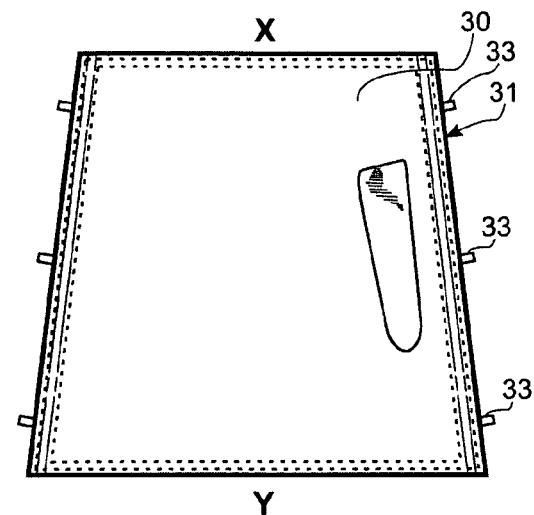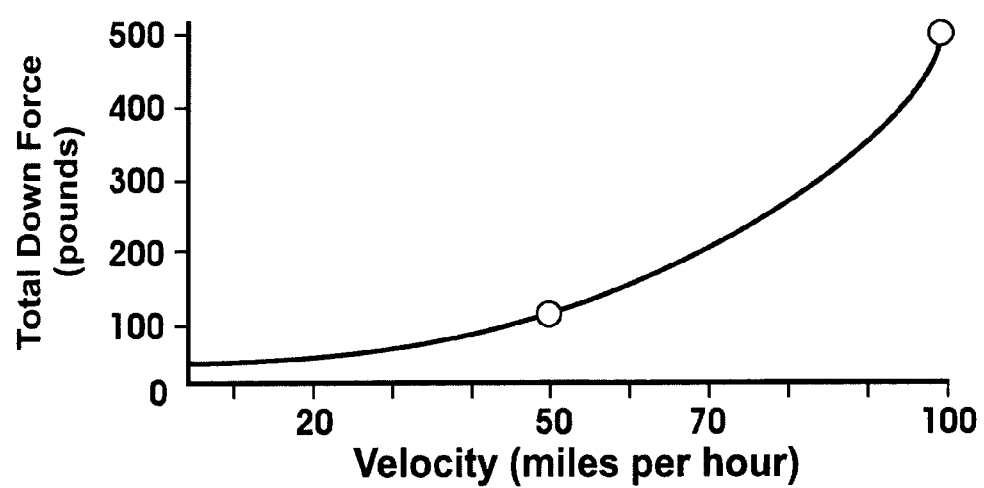

CAMPER SHELL APPARATUS FOR TRUCKS

FIELD OF THE INVENTION

The present invention relates generally to camper shells for pickup trucks and, more particular, to a camper shell apparatus that is collapsible and adjustable.

BACKGROUND OF THE INVENTION

Pickup-truck camper shells are mounted over a pick-up truck bed, and permit the conversion of the bed into a closed area. Conventional camper shells are constructed of rigid and heavy materials such as fiberglass or metal and are not easily installed or removed from the truck. They are also not readily adaptable to fit different size truck beds.

U.S. Pat. No. 4,813,734, issued to the applicant herein, is directed to a removable camper shell apparatus. The '734 patent discloses a collapsible frame over which a tarp type of covering may be placed. That apparatus has the advantage of collapsibility for storage purposes.

However, a need exists for a camper shell that is not only collapsible, but that also is adjustable to fit a plurality of bed sizes. There is a further need for a collapsible camper shell providing an improved coupling between and among the cover, the shell frame and the truck bed. There is a yet further need for a collapsible camper shell that eliminates the need for tie-down straps or the bolting of a frame to a truck bed (or the creation of holes in the truck bed for such purpose). The present invention satisfies these needs and provides other, related, advantages.

SUMMARY OF THE INVENTION

In accordance with one embodiment of the present invention, an improved camper shell apparatus comprising, in combination: a collapsible frame; wherein the collapsible frame comprises: a first bottom frame component adapted to be positioned on top of a first long side of a pickup truck bed; a second bottom frame component adapted to be positioned on top of a second long side of a pickup truck bed; a first rear vertical support coupled at a first end thereof to the first bottom frame component; a second rear vertical support coupled at a first end thereof to the second bottom frame component; a first center vertical support coupled at a first end thereof to the first bottom frame component; a second center vertical support coupled at a first end thereof to the second bottom frame component; a first forward vertical support coupled at a first end thereof to the first bottom frame component; a second forward vertical support coupled at a first end thereof to the second bottom frame component; a rear cross-member having at each of a first end and a second end thereof at least a forward projection and a downward projection; a center cross-member having at each of a first end and a second end thereof a forward projection, a rearward projection, and a downward projection; a forward cross-member having at each of a first end and a second end thereof a rearward projection and a downward projection; a first horizontal support coupling between the forward projection on the first end of the rear cross member and the rearward projection on the first end of the center cross-member; a second horizontal support coupling between the forward projection on the first end of the center cross-member and the rearward projection on the first end of the forward cross-member; a third horizontal support coupled between the forward projection on the second end of the rear cross member and the rearward projection on the second end of the center cross-member; a fourth horizontal support coupling between the forward projection on the second end of the center cross-member and the rearward projection on the second end of the forward cross-member; for each the rear, center and forward vertical support, a clamp joining the vertical support to a bed of a pickup truck; and a cover adapted to be fitted over the collapsible frame; wherein a first edge of the cover is adapted to be interposed between the first bottom support and the top of the pickup truck bed; and wherein a second edge of the cover is adapted to be interposed between the second bottom support and the top of the pickup truck bed.

In accordance with another embodiment of the present invention, an improved camper shell apparatus comprising, in combination: a collapsible frame; wherein the collapsible frame comprises: a first bottom frame component adapted to be positioned on top of a first long side of a pickup truck bed; a second bottom frame component adapted to be positioned on top of a second long side of a pickup truck bed; wherein each of the first bottom frame component and the second bottom frame component has an adjustable length; a first rear vertical support coupled at a first end thereof to the first bottom frame component; a second rear vertical support coupled at a first end thereof to the second bottom frame component; a first center vertical support coupled at a first end thereof to the first bottom frame component; a second center vertical support coupled at a first end thereof to the second bottom frame component; a first forward vertical support coupled at a first end thereof to the first bottom frame component; a second forward vertical support coupled at a first end thereof to the second bottom frame component; a rear cross-member having at each of a first end and a second end thereof at least a forward projection and a downward projection; a center cross-member having at each of a first end and a second end thereof a forward projection, a rearward projection, and a downward projection; a forward cross-member having at each of a first end and a second end thereof a rearward projection and a downward projection; wherein each of the rear cross-member, the center cross-member, and the forward cross-member has an adjustable length; a first horizontal support coupling between the forward projection on the first end of the rear cross member and the rearward projection on the first end of the center cross-member; a second horizontal support coupling between the forward projection on the first end of the center cross-member and the rearward projection on the first end of the forward cross-member; a third horizontal support coupled between the forward projection on the second end of the rear cross member and the rearward projection on the second end of the center cross-member; a fourth horizontal support coupling between the forward projection on the second end of the center cross-member and the rearward projection on the second end of the forward cross-member; for each the rear, center and forward vertical support, a clamp joining the vertical support to a bed of a pickup truck; and a cover adapted to be fitted over the collapsible frame; wherein a first edge of the cover is adapted to be interposed between the first bottom support and the top of the pickup truck bed; and wherein a second edge of the cover is adapted to be interposed between the second bottom support and the top of the pickup truck bed.

In accordance with a further embodiment of the present invention, an improved camper shell apparatus comprising, in combination: a collapsible frame; wherein the collapsible frame comprises: a first bottom frame component adapted to be positioned on top of a first long side of a pickup truck bed; a second bottom frame component adapted to be positioned on top of a second long side of a pickup truck bed; wherein each of the first bottom frame component and the second bottom frame component has an adjustable length; a first rear vertical support coupled at a first end thereof to the first bottom frame component; a second rear vertical support coupled at a first end thereof to the second bottom frame component; a first center vertical support coupled at a first end thereof to the first bottom frame component; a second center vertical support coupled at a first end thereof to the second bottom frame component; a first forward vertical support coupled at a first end thereof to the first bottom frame component; a second forward vertical support coupled at a first end thereof to the second bottom frame component; a rear cross-member having at each of a first end and a second end thereof at least a forward projection and a downward projection; wherein the rear cross-member further comprises at each of the first end and the second end a rearward projection and further comprising first and second rear supports, each of which is adapted to be coupled to one the rearward projection and to one the bottom horizontal support; a center cross-member having at each of a first end and a second end thereof a forward projection, a rearward projection, and a downward projection; a forward cross-member having at each of a first end and a second end thereof a rearward projection and a downward projection; wherein each of the rear cross-member, the center cross-member, and the forward cross-member has an adjustable length; the rear cross-member further comprises at substantially a center point thereof a forward projection; the center cross-member further comprises at substantially a center point thereof a forward projection and, opposite thereto, a rearward projection; the forward cross-member further comprises at substantially a center point thereof a rearward projection; a first horizontal support coupling between the forward projection on the first end of the rear cross member and the rearward projection on the first end of the center cross-member; a second horizontal support coupling between the forward projection on the first end of the center cross-member and the rearward projection on the first end of the forward cross-member; a third horizontal support coupled between the forward projection on the second end of the rear cross member and the rearward projection on the second end of the center cross-member; a fourth horizontal support coupling between the forward projection on the second end of the center cross-member and the rearward projection on the second end of the forward cross-member; a fifth horizontal support adapted to couple between the forward projection located substantially at the center point of the rear cross-member and the rearward projection located substantially at the center point of the center cross-member; and a sixth horizontal support adapted to couple between the forward projection located substantially at the center point of the center cross-member and the rearward projection located substantially at the center point of the forward cross-member; for each the rear, center and forward vertical support, a clamp joining the vertical support to a bed of a pickup truck; and wherein the shell frame has a downward taper from a rear portion thereof to a forward portion thereof; and a cover adapted to be fitted over the collapsible frame; wherein the cover has a trapezoidal shape; wherein a first edge of the cover is adapted to be interposed between the first bottom support and the top of the pickup truck bed; and wherein a second edge of the cover is adapted to be interposed between the second bottom support and the top of the pickup truck bed.

BRIEF DESCRIPTION OF THE DRAWINGS

FIG. 3B is a perspective view of an embodiment of the shell frame portion of a truck bed covering consistent with an embodiment of the present invention, installed on a pickup truck, in which the telescopic cross members are collapsed.

FIG. 3C is a perspective view of the shell frame of FIG. 3B, in an extended configuration, with the telescopic cross-members expanded.

FIG. 4E is a perspective view of a rear or center vertical support component of the shell frame portion of a truck bed covering consistent with an embodiment of the present invention, including a coupling member attached thereto.

FIG. 4F is a perspective view of a forward vertical support component of the shell frame portion of a truck bed covering consistent with an embodiment of the present invention, including a coupling member attached thereto.

FIG. 4G is a perspective view of a non-load bearing, aerodynamic enhancing, supplemental vertical component of the shell frame portion of a truck bed covering consistent with an embodiment of the present invention.

FIG. 4H is a perspective view of a telescoping, rear, cross-member component of the shell frame portion of a truck bed covering consistent with an embodiment of the present invention.

FIG. 4I is a perspective view of a telescoping, center, cross-member component of the shell frame portion of a truck bed covering consistent with an embodiment of the present invention.

FIG. 4J is a perspective view of a telescoping, forward, cross-member component of the shell frame portion of a truck bed covering consistent with an embodiment of the present invention.

FIG. 5B is a top view of a cover portion of a truck bed covering consistent with an embodiment of the present invention, prior to installation on a shell frame.

FIG. 5C is a top view of a cover portion of a truck bed covering consistent with another embodiment of the present invention, prior to installation on a shell frame.

FIG. 6 is a graph illustrating the relationship between vehicle velocity and downward force applied on a truck bed covering positioned thereon, in accordance with the empirical formula $ADF=5(.1V)^2$.

DETAILED DESCRIPTION OF THE PREFERRED EMBODIMENTS

Figure 1:
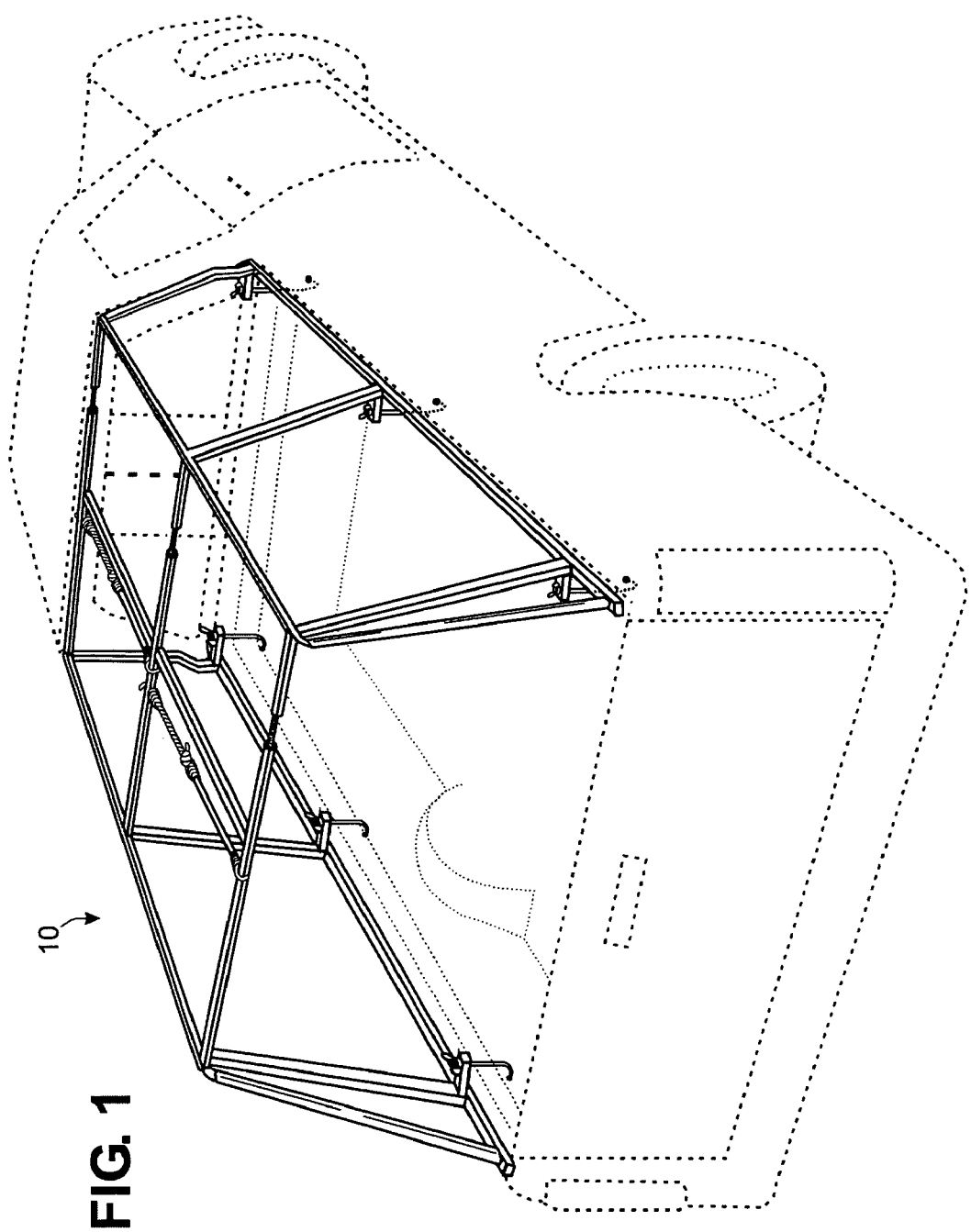
FIG. 1 is a perspective view of an embodiment of the shell frame portion of a truck bed covering consistent with an embodiment of the present invention, installed on a pickup truck, in which the telescopic cross members are expanded.
Figure 2:
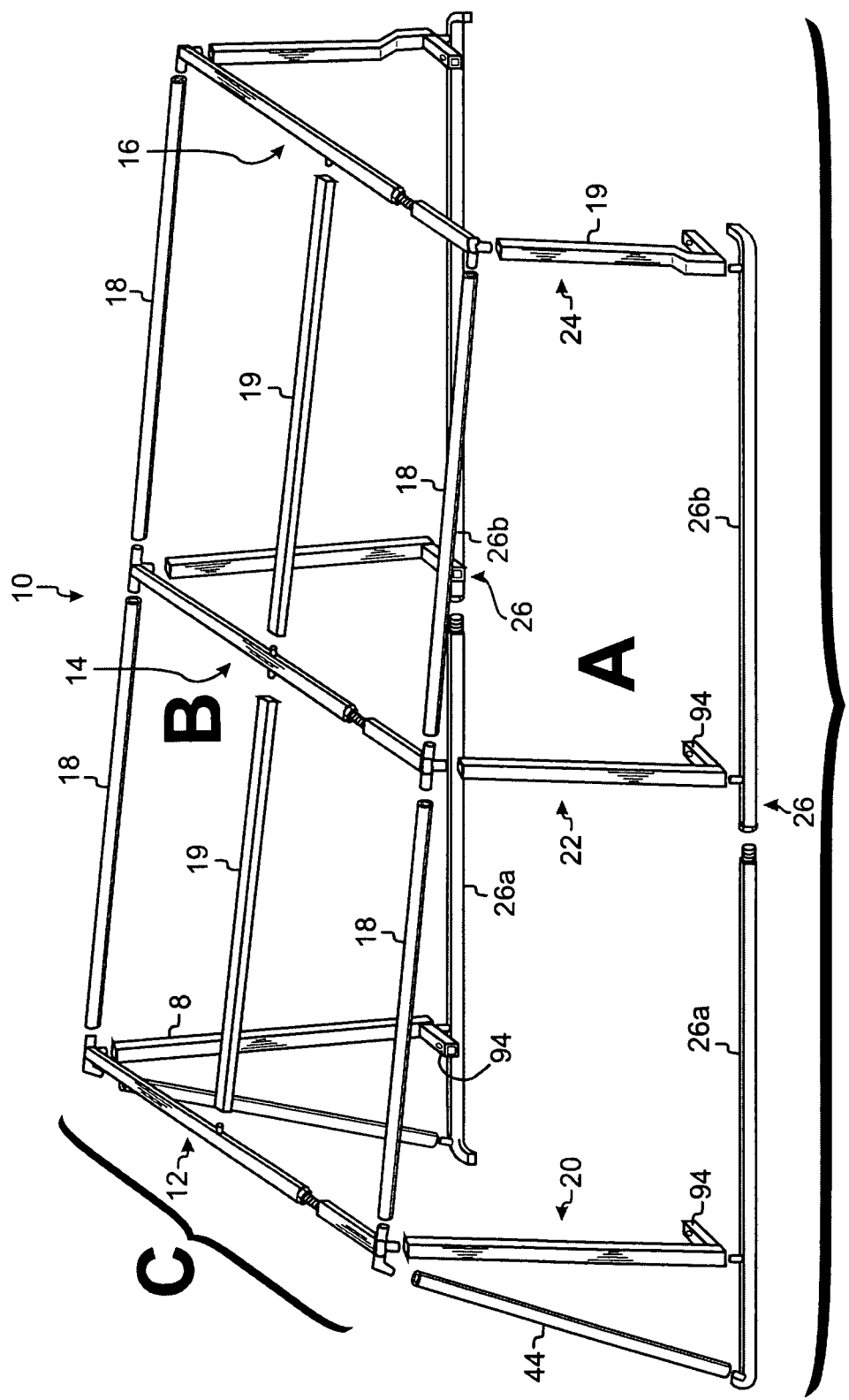
FIG. 2 is an exploded, perspective view of the shell frame portion of a truck bed covering consistent with an embodiment of the present invention.

Referring first to FIGS. 1 and 2, the basic components of an embodiment of a shell frame portion 10 of a camper shell consistent with the present invention are illustrated. Initially, it should be observed that the shell frame 10 defines a substantially U-shaped, inverted, structure. That structure comprises a first side A, a second side B opposite thereto, and a top C.

Referring first to the top C, it has a substantially rectangular shape. It is preferably formed by three telescoping cross-members (a rear cross-member 12, a center cross-member 14, and a forward cross-member 16) which define the width of top C, and which are interconnected with four longitudinal supports 18 and two longitudinal supports 19 that define the length of top C. As hereinafter described, each of the cross-members 12, 14, and 16 are adjustable in length, so as to be able to fit a plurality of truck bed widths and to enable the covering to be placed over the collapsed frame and then to be stretched by the frame as it expands.

Sides A and B each also have a substantially rectangular shape. (As described herein, it is preferred that sides A and B each have a slight downward slope from the rear to the forward portions thereof.) The width of sides A and B is defined by vertical supports (rear vertical support 20, center vertical support 22, and forward vertical support 24). The length of sides A and B is defined by two of the longitudinal supports 18 along one edge and by a bottom frame component 26 along a second edge. Preferably, as described herein, the bottom frame components 26 are adjustable in length, so as to be able to fit a plurality of truck bed lengths.

Figure 1A:
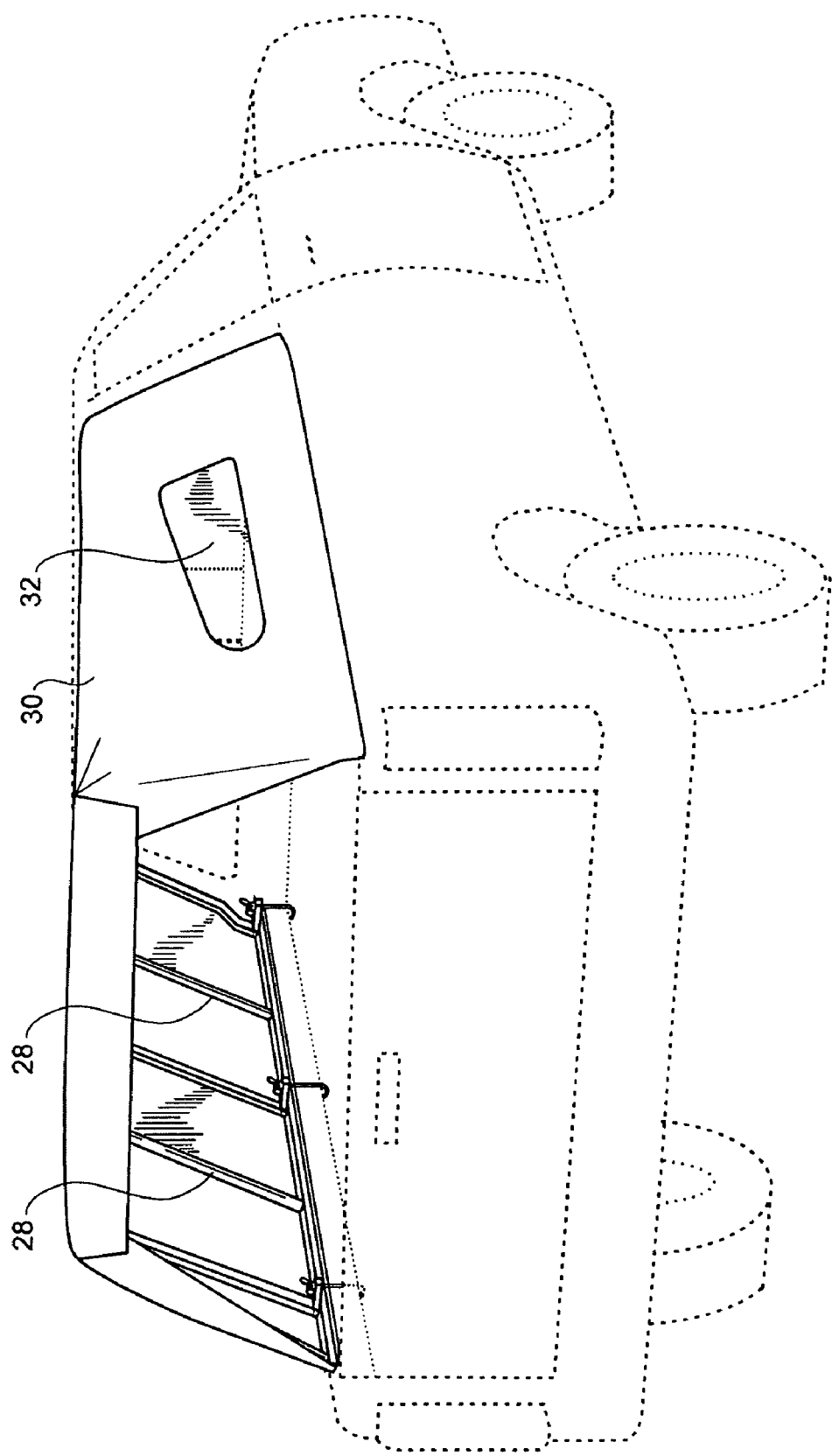
FIG. 1A is a perspective view of an embodiment of a truck bed covering consistent with an embodiment of the present invention, installed on a pickup truck, showing both the load bearing and the non-load bearing vertical posts.
Figure 4:
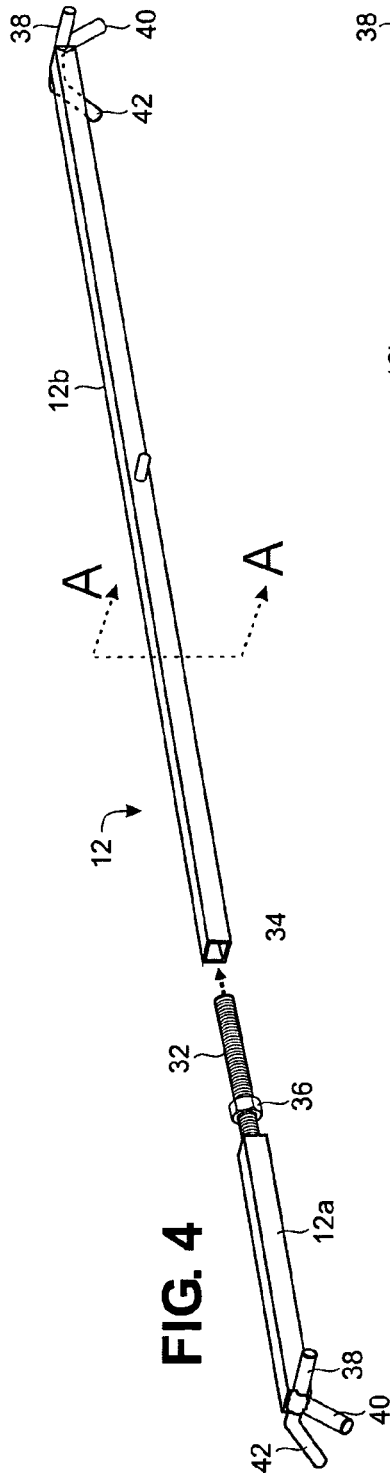
FIG. 4 is a perspective view of a rear, telescoping, cross-member component of the shell frame portion of a truck bed covering consistent with an embodiment of the present invention, in a first configuration.

Referring briefly to FIGS. 1A and 4G, in one embodiment, supplemental vertical members 28 may also be provided. Because these need not be load bearing, they may be formed of a plastic material, such as PVC. The members 28 are thought to improve the aerodynamics of the assembled structure.

Referring now to FIGS. 1A, 3, 3A and 5C, it can be seen that a cover 30 is provided, and is adapted to cover the shell frame 10. In this embodiment, the cover 30 has a right side window 32, which is intended to provide greater viewing ability for the driver during transit, and in particular to allow a driver to check his or her blind spot. FIG. 5B illustrates a cover 30' which does not have the side window 32.

With specific regard to FIGS. 5B and 5C, it can be seen that it is preferred that the cover 30 have a substantially trapezoidal configuration when in a fully open position, with the edge X of the cover 30 to be deployed in the forward portion of the truck bed having a shorter length than that of edge Y, to be deployed in the rear portion of the truck bed. This configuration permits the cover 30 to exhibit the downward slope shown most prominently in FIG. 3A. The downward taper is desirable for purposes of permitting water striking the cover 30 to drain off, for aerodynamic purposes, and to prevent the structure from blowing off of the vehicle at high speeds.

Figure 5:
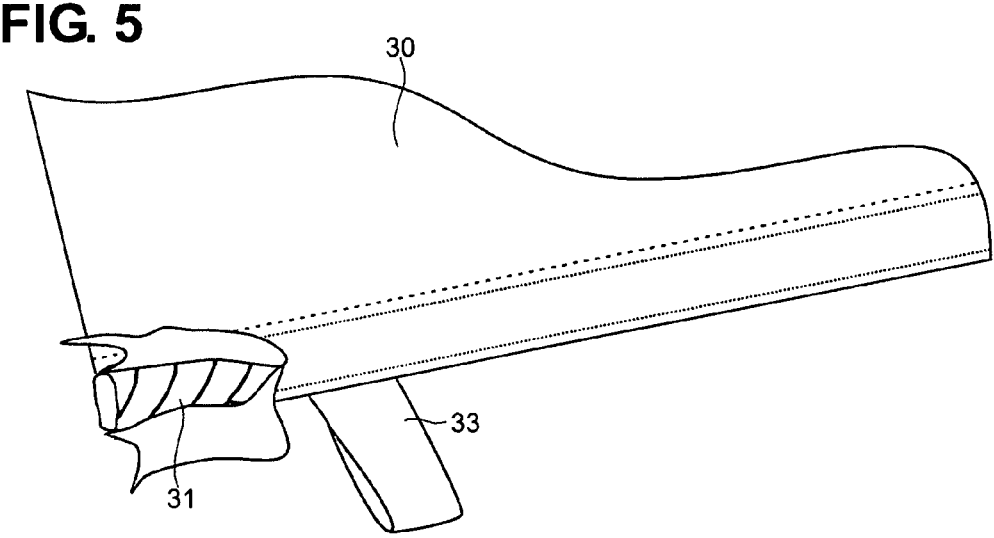
FIG. 5 is a perspective, partially cut-away view of a covering portion of a truck bed covering consistent with an embodiment of the present invention, showing a rope sewed into the side end of the covering.

Referring now to FIGS. 5–5C, it is preferred to provide a cord 31 along the long sides of the cover 30. Preferably, this is accomplished by sewing the line 31 into the long perimeter of the long sides. The purpose of the cord 31 will be explained more fully below. It is also preferred to provide, also along the long sides of the cover 30, a plurality of loops 33. The loops 33 are utilized as pull-tabs, to assist the process of pulling the cover 30 under the bottom frame components 26, as hereinafter described.

Figure 4A:
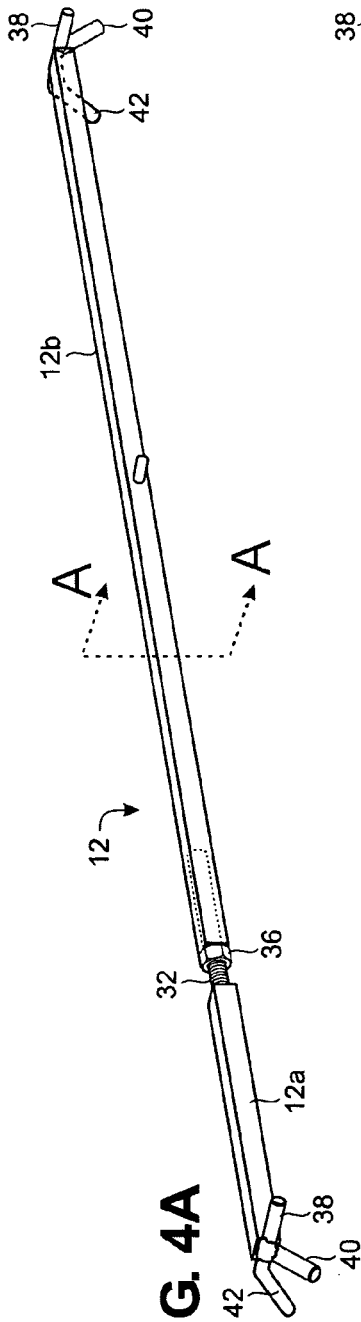
FIG. 4A is a perspective view of the rear, telescoping, cross-member component of FIG. 4, in a second configuration.
Figure 4B:
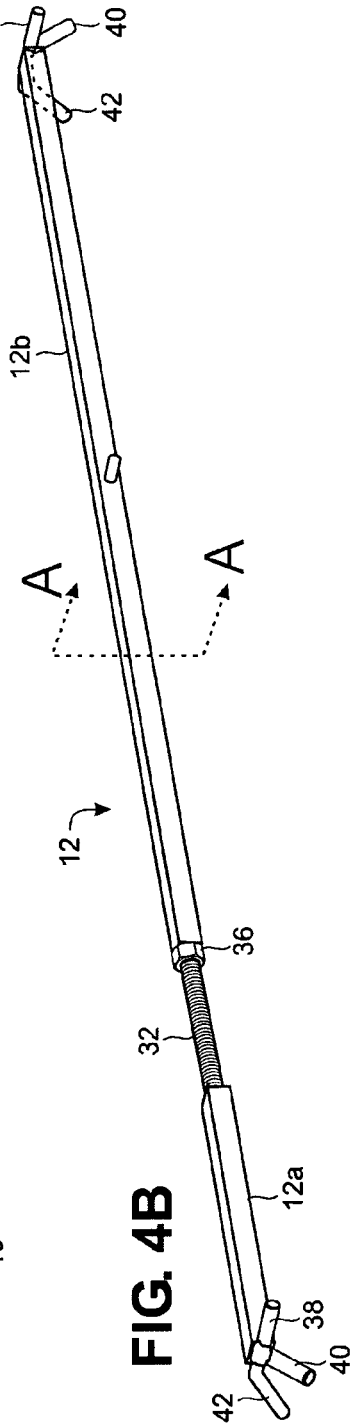
FIG. 4B is a perspective view of the rear, telescoping, cross-member component of FIG. 4, in a third configuration.

Referring now to FIGS. 2, 4A–4C and 4H, a more full description is provided for rear cross member 12. Preferably, rear cross-member 12 consists of a first section 12a and a second section 12b. First section 12a preferably has a threaded rod 32 projecting from a first end thereof, which threaded rod 32 is dimensioned to be received into an opening 34 in a first end of the second section 12b—as illustrated in FIGS. 4 and 4A. The extent of penetration of the threaded rod 32 into the second section 12b, and thus the overall length of the rear cross-member 12, is determined by the positioning of a nut 36 along the threaded rod 32. The positioning of the nut 36 more proximate the first section 12a (e.g., FIG. 4A) causes greater penetration of the threaded rod 32 and thus a shorter overall length of the rear cross-member 12. The positioning of the nut 36 more proximate the second section 12b (e.g., FIG. 4A) reduces the penetration of the threaded rod 32 and thus accounts for a longer overall length of the rear cross-member 12 (e.g., FIG. 4B).

Second ends of each of the first section 12a and the second section 12b each preferably feature three projections—a forward projection 38, a lateral projection 40, and a rear projection 42. As shown in FIG. 2, the forward projection 38 is adapted to be inserted into an open end of a longitudinal support 18. The lateral projection 40 is adapted to be inserted into an open end of a rear vertical support 20. The rear projection 42 is adapted to be inserted into an open end of a rear support 44.

It can be seen that the rear cross-member 12 also preferably features a center projection 46 located proximate a mid-point thereof, which is adapted to be inserted into an open end of a longitudinal support 19.

Referring now to FIGS. 2 and 4I, a more full description is provided for center cross member 14. Preferably, center cross-member 14 consists of a first section 14a and a second section 14b. First section 14a preferably has a threaded rod 52 projecting from a first end thereof, which threaded rod 52 is dimensioned to be received into an opening (not shown) in a first end of the second section 14b—in the same manner as discussed above with respect to the rear cross-member 12 and its respective threaded rod and opening, so as to permit length adjustment of the center cross-member 14.

Second ends of each of the first section 14a and the second section 14b each preferably feature three projections—a forward projection 58, a downward projection 60, and a rear projection 62. The forward projection 58 and rear projection 62 are each adapted to be inserted into an open end of a longitudinal support 18. The downward projection 60 is adapted to be inserted into an open end of a center vertical support 22.

It can be seen that the center cross-member 14 also preferably features two center projections 66 located on opposite sides of the cross-member 14 proximate a midpoint thereof, each of which is adapted to be inserted into an open end of a longitudinal support 19.

Referring now to FIGS. 2 and 4J, a more full description is provided for forward cross member 16. Preferably, forward cross-member 16 consists of a first section 16a and a second section 16b. First section 16a preferably has a threaded rod 72 projecting from a first end thereof, which threaded rod 72 is dimensioned to be received into an opening (not shown) in a first end of the second section 16b—in the same manner as discussed above with respect to the rear cross-member 12 and its respective threaded rod and opening, so as to permit length adjustment of the forward cross-member 16.

Second ends of each of the first section 16a and the second section 16b each preferably feature two—a rear projection 78 and a downward projection 80. The rear projection 78 is adapted to be inserted into an open end of a longitudinal support 18. The downward projection 80 is adapted to be inserted into an open end of a forward vertical support 24.

It can be seen that the forward cross-member 16 also preferably features a center projection 76 located proximate a mid-point thereof, which is adapted to be inserted into an open end of a longitudinal support 19.

Figure 4C:
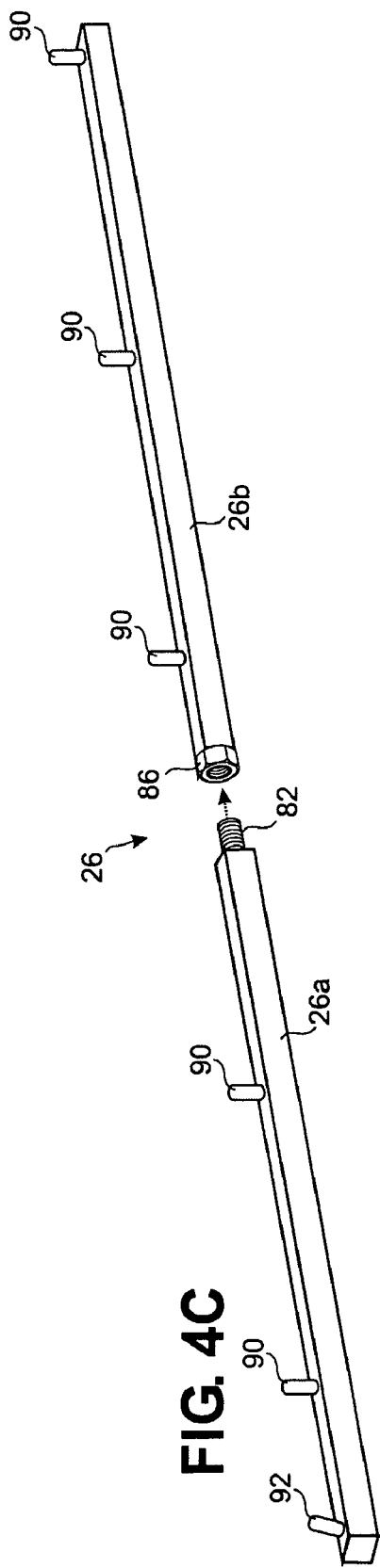
FIG. 4C is a perspective view of a bottom frame component of the shell frame portion of a truck bed covering consistent with an embodiment of the present invention, in a first configuration.
Figure 4D:
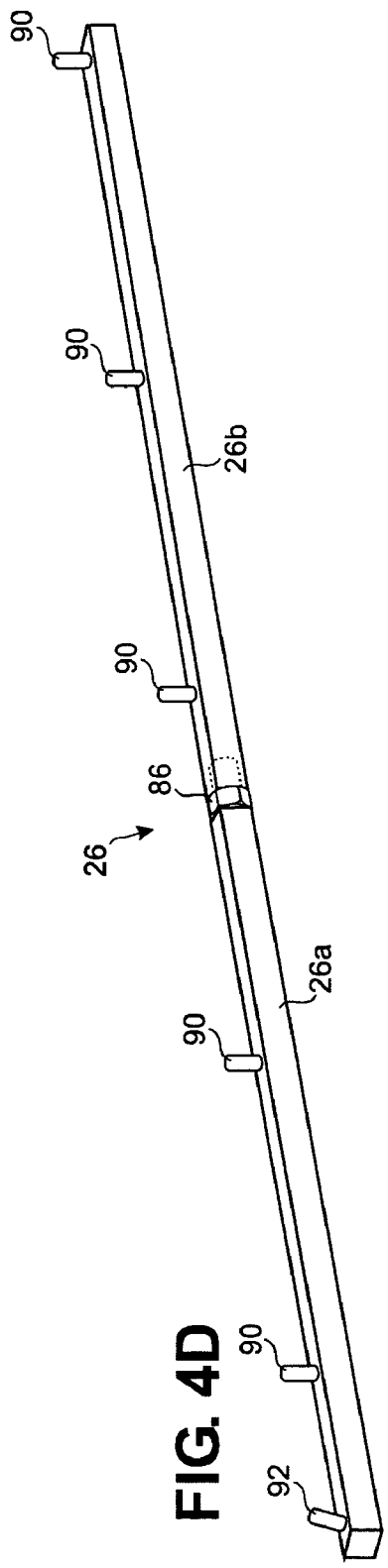
FIG. 4D is a perspective view of the bottom frame component of FIG. 4C, in a second configuration.

Referring now to FIGS. 2 and 4C–4D, a description is provided for bottom frame components 26. Preferably, bottom frame components 26 each consists of a first section 26a and a second section 26b. First section 26a preferably has a threaded rod 82 projecting from a first end thereof, which threaded rod 82 is dimensioned to be threaded through nut 86 which is preferably welded or otherwise fixedly attached to section 26b at the opening thereof, as shown in FIG. 4C. The extent of the threading of threaded rod 82 through nut 86 determines the length of the bottom frame component 26, and permits length adjustment thereof. It also holds the front half of the frame to the rear half.

The bottom frame components preferably have a plurality of upward projections 90 located along a length thereof (including at least one proximate a forward end of the bottom frame component 26, one proximate the middle of the bottom frame component 26, and one proximate though slightly before the rear end of the bottom frame component—as shown in FIG. 2), and an inward projection 92 proximate the rear end of the bottom frame component 26.

As shown in FIG. 2, the upward projection 90 located proximate the forward end of the bottom frame component 26 is adapted to be inserted into an open end of the forward vertical support 24. The upward projection 90 located proximate the middle of the bottom frame component 26 is adapted to be inserted into an open end of the center vertical support 22. And the upward projection 90 located proximate the rear end of the bottom frame component 26 is adapted to be inserted into an open end of the rear vertical support 20. Still referring to FIG. 2, the inward projection 92 is adapted to be inserted into an open end of the rear support 44.

Referring now to FIGS. 1A and 4G, the additional upward projections 90 (other than the rear, middle and forward ones described in the preceding paragraph) are adapted to be inserted into an open end of a supplemental vertical member 28. FIG. 1A shows the use of two supplemental members 28, though in some embodiments as few as one or three or more may be desired.

FIG. 4E shows a center vertical support 22, which preferably is structurally identical to the rear vertical supports 20. (See FIG. 2). The center and rear vertical supports 20 and 22 are preferably substantially L-shaped. They should be open at a top portion of the long leg thereof to receive the suitable downward projection from the rear cross-member 12 or center cross-member 14, and open at a bottom portion of the long leg thereof to receive an upward projection 90.

The short leg of the substantially L-shaped center and rear vertical supports 20 and 22 should, preferably, have an opening 94 therethrough. The openings 94 are each adapted to receive therethrough a substantially J-shaped clamp 96.

As illustrated in FIG. 4E, the J-shaped clamp 96 should be dimensioned so that the curved portion thereof may be hooked under an upper lip 98 of a truck bed. As further illustrated in this figure, the portion of the J-shaped clamp 96 projecting upward through opening 94 should be threaded, so that it may receive a nut 100 (preferably of the wing-nut type so that it may be finger-tightened) above the short leg of the rear vertical support 20. Tightening of the nut 100 causes the curved portion of the clamp 96 to travel upward, tightening it against the upper lip 98. This action also causes the associated bottom frame component 26 to be pulled downward in the direction of the truck bed.

FIGS. 2 and 4F show a forward vertical support 24. Like the center and rear vertical supports 20 and 22, the forward vertical support 24 is preferably substantially L-shaped. It should be open at a top portion of the long leg thereof to receive the suitable downward projection from the rear cross-member 12 or center cross-member 14, and open at a bottom portion of the long leg thereof to receive an upward projection 90.

The short leg of the substantially L-shaped forward vertical supports 24 should, preferably, have an opening 94 therethrough, for purposes of receiving therethrough a substantially J-shaped clamp 96 as described above with respect to the center and rear vertical supports 20 and 22.

As illustrated in FIG. 4F, the long leg of the forward vertical support 24 preferably has a substantially Z-shape, so as to cause the upper portion thereof to be more inward of the truck bed than the lower portion of the long leg of the forward vertical support 24. This contributes to the formation of an inward taper of the sides of the cover 30 when in position on the frame 10. This has the effect of increasing visibility for the driver along the sides of the vehicle, and is thought to improve the aerodynamics of the vehicle with the cover 30 thereon.

With respect to the materials utilized in the construction of the component portions of the frame 10, and other than as discussed above, it is desired that these be relatively high-strength and also relatively lightweight. As shown in FIG. 6, increasing and relatively significant downward force is exercised by the wind on the top of the camper shell as vehicle speed increases. The components of the frame 10 should be sufficiently strong to be able to withstand such forces. It is preferred that the components shown as having four sides in the drawing figures be comprise of square steel tubing, and 0.5" tubing is thought to be particularly optimal. The component portions shown has having a rod-like configuration are preferably comprises of rod steel, preferably having a 0.375" diameter. The actual sizes selected should permit, where necessary, insertion of components into one another, as illustrated and described herein.

Referring again to FIG. 6, total down force (TDF) may be expressed by the formula $TDF=W+5(0.1\ V)^2$, where W equals the weight of the shell (preferably approximately 35 pounds) and V equals the velocity of the vehicle. Aerodynamic down force (ADF) may be expressed by the formula $ADF=5(.1V)^2$.

STATEMENT OF OPERATION

The assembly of the truck bed cover of the present invention preferably begins with the basic components of the frame 10, as illustrated in FIGS. 1 and 2. In particular, bottom frame components 26 are positioned on the long sides of a truck bed. The length of the bottom frame components 26 may be adjusted, as described above, as needed.

Rear vertical support 20, center vertical support 22, and forward vertical support 24 are positioned on the bottom frame components 26. The J-shaped clamps 96 are utilized to, loosely at first, couple these components to the truck bed.

The rear cross-member 12, center cross-member 14, and forward cross-member 16 are coupled to the side supports as described above. The length of the cross-members 12, 14 and 16, and thus the overall width of the frame 10, may be adjusted as needed to fit the width of a particular truck bed. The longitudinal supports 18 and 19 are coupled to the cross-members, to complete the top C. During assembly, a bungee cord 99 (see FIG. 1) should be used to temporarily hold components together. The rear cross-member 12 should be further coupled to the bottom frame components 26 utilizing rear supports 44.

Figure 5A:
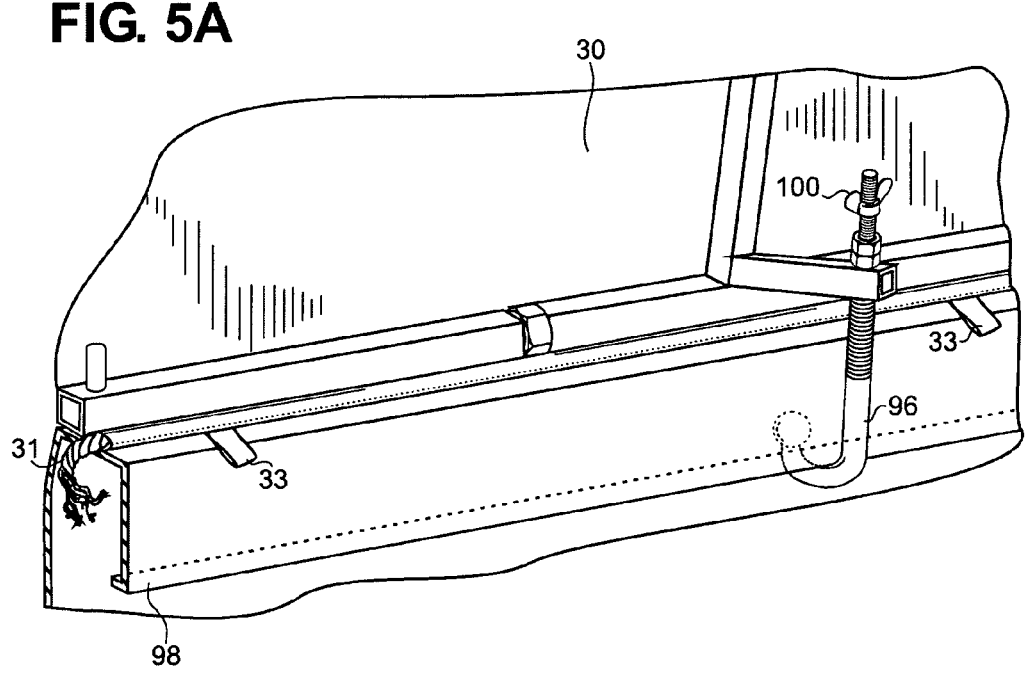
FIG. 5A is a perspective view illustrating coupling between a covering and a bottom frame component of a truck bed covering consistent with an embodiment of the present invention, which allows the telescoping frame to be expanded so that the covering can be tightly stretched over the frame.

The cover 30 should be positioned to cover the frame 10, as shown for example in 1A, 3 and 3A. The cover 30 should be placed over the frame 10 before its components are fully expanded, so that the cover 30 is tightened as the components of the frame 10 are fully expanded. As shown in FIG. 5A, the portion of the cover 30 containing the cord 31 should be positioned under the bottom frame components 26, so that the cord 31 is in the interior of the frame 10 and the remainder of the cover is on the outside of the frame 10. (The loops 33 are utilized to pull this portion of the cover 30 under the bottom frame components 26.) Final tightening of the clamps 96 should only occur after the cover 30 and cord 31 are properly positioned as described herein.

Figure 3:
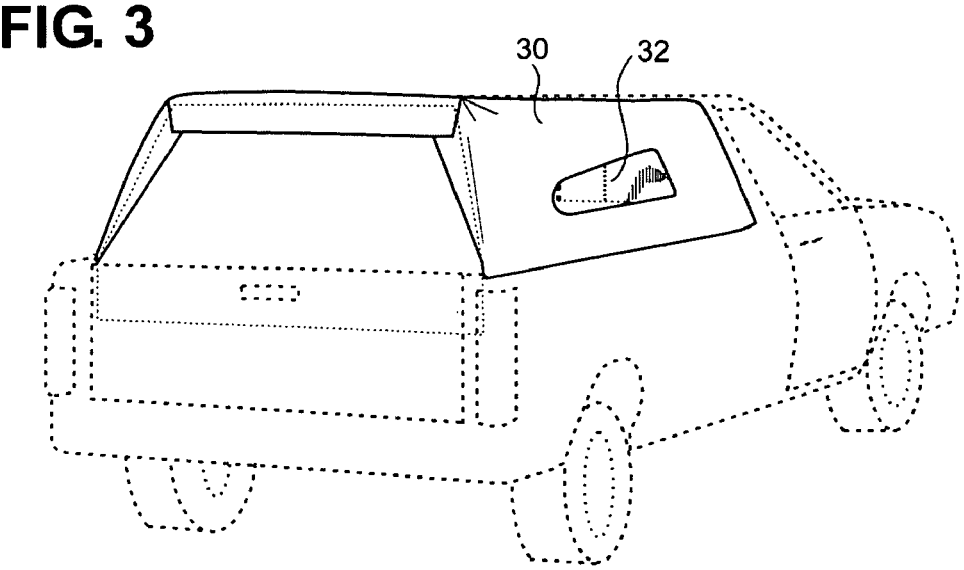
FIG. 3 is a perspective view of another embodiment of a truck bed covering consistent with an embodiment of the present invention, installed on a pickup truck.
Figure 3A:
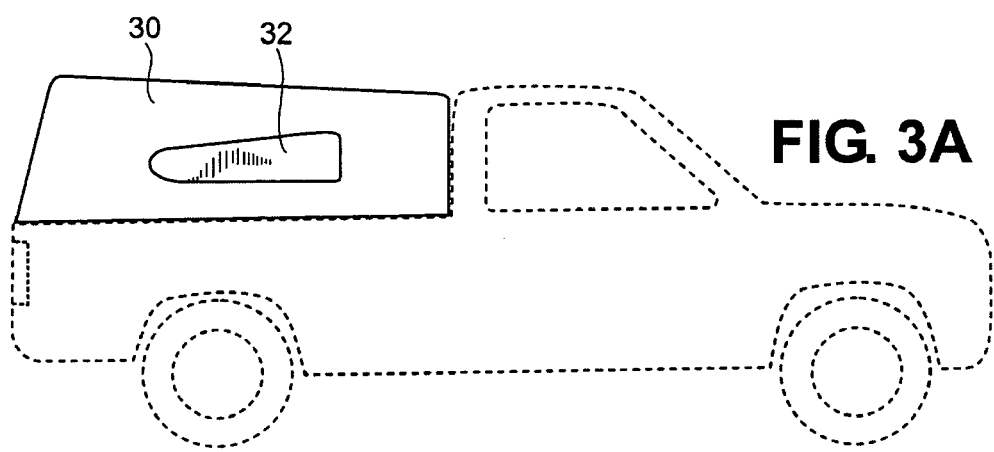
FIG. 3A is a side view of the truck bed covering of FIG. 3, showing the slope of the camper shell and windows thereon.
Figure 3D:
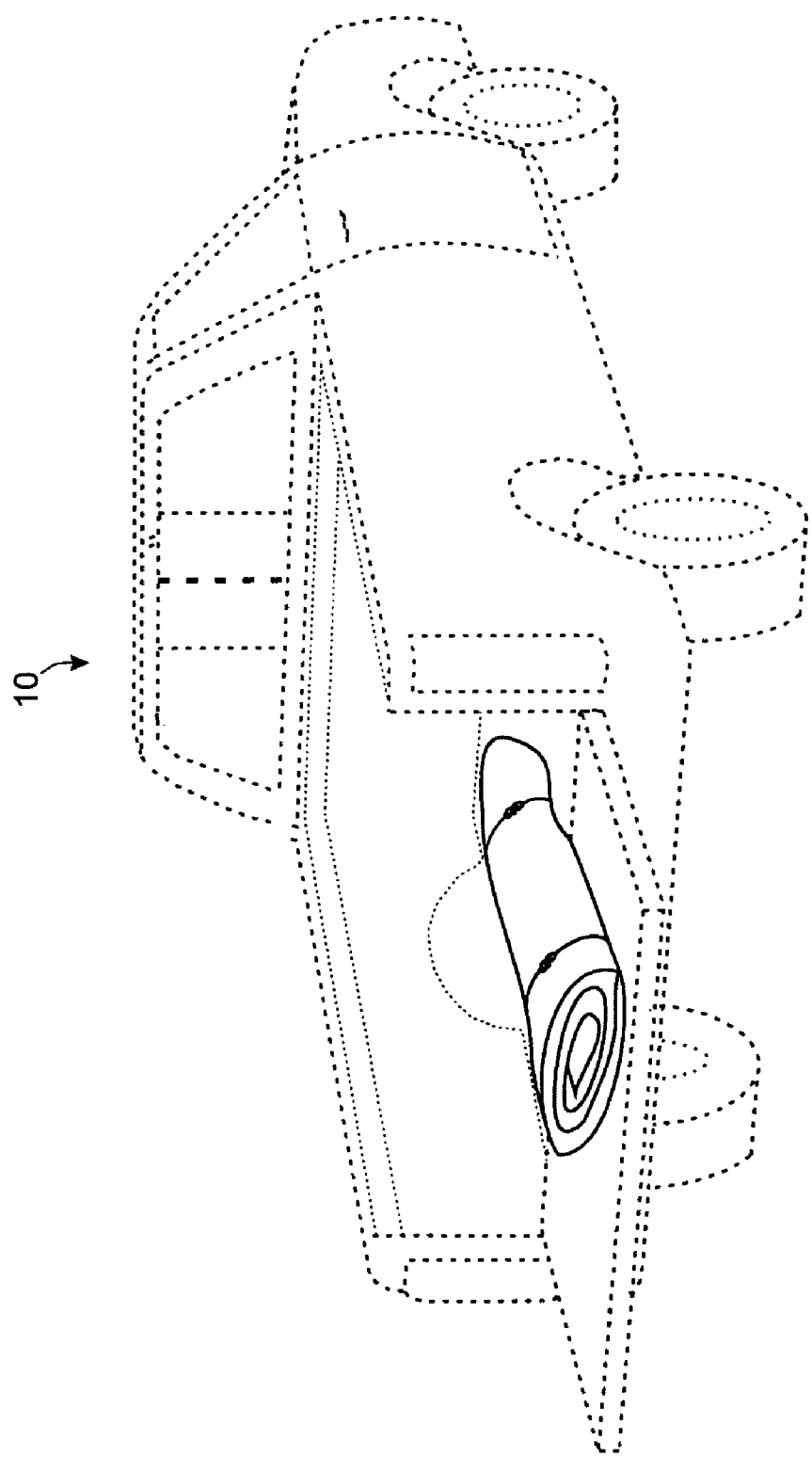
FIG. 3D is a perspective view of the cover portion of a truck bed covering consistent with an embodiment of the present invention, in a stored configuration.

The camper shell may be disassembled by reversing these steps. When disassembled, it will be preferred to store the individual components within the cover 30, and to roll or fold the cover 30 as for example shown in FIG. 3D. This provides for ready portability and convenient storage of the camper shell when not in use.

I claim:

1. An improved camper shell apparatus comprising, in combination:
    a collapsible frame;
    wherein said collapsible frame comprises:
        a first bottom frame component adapted to be positioned on top of a first long side of a pickup truck bed;
        a second bottom frame component adapted to be positioned on top of a second long side of a pickup truck bed;
        a first rear vertical support coupled at a first end thereof to said first bottom frame component;
        a second rear vertical support coupled at a first end thereof to said second bottom frame component;
        a first center vertical support coupled at a first end thereof to said first bottom frame component;
        a second center vertical support coupled at a first end thereof to said second bottom frame component;
        a first forward vertical support coupled at a first end thereof to said first bottom frame component;
        a second forward vertical support coupled at a first end thereof to said second bottom frame component;
        a rear cross-member having at each of a first end and a second end thereof at least a forward projection and a downward projection;
        a center cross-member having at each of a first end and a second end thereof a forward projection, a rearward projection, and a downward projection;
        a forward cross-member having at each of a first end and a second end thereof a rearward projection and a downward projection;
        a first horizontal support coupling between said forward projection on said first end of said rear cross member and said rearward projection on said first end of said center cross-member;
        a second horizontal support coupling between said forward projection on said first end of said center cross-member and said rearward projection on said first end of said forward cross-member;
        a third horizontal support coupled between said forward projection on said second end of said rear cross member and said rearward projection on said second end of said center cross-member;
        a fourth horizontal support coupling between said forward projection on said second end of said center cross-member and said rearward projection on said second end of said forward cross-member;
        for each said rear, center and forward vertical support, a clamp joining said vertical support to a bed of a pickup truck; and
    a cover adapted to be fitted over said collapsible frame;
    wherein a first edge of said cover is adapted to be interposed between said first bottom frame component and said top of said pickup truck bed; and
    wherein a second edge of said cover is adapted to be interposed between said second bottom frame component and said top of said pickup truck bed.

2. The improved camper shell of claim 1 wherein each of said first bottom frame component and said second bottom frame component has an adjustable length.

3. The improved camper shell of claim 1 wherein said rear cross-member further comprises at each of said first end and said second end a rearward projection and further comprising first and second rear supports, each of which is adapted to be coupled to one said rearward projection and to one said bottom horizontal support.

4. The improved camper shell of claim 1 wherein each of said rear cross-member, said center cross-member, and said forward cross-member has an adjustable length.

5. The improved camper shell of claim 1 wherein:
    said rear cross-member further comprises at substantially a center point thereof a forward projection;
    said center cross-member further comprises at substantially a center point thereof a forward projection and, opposite thereto, a rearward projection; and
    said forward cross-member further comprises at substantially a center point thereof a rearward projection.

6. The improved camper shell of claim 5 further comprising:

a fifth horizontal support adapted to couple between said forward projection located substantially at said center point of said rear cross-member and said rearward projection located substantially at said center point of said center cross-member; and a sixth horizontal support adapted to couple between said forward projection located substantially at said center point of said center cross-member and said rearward projection located substantially at said center point of said forward cross-member.

7. The improved camper shell of claim 1 wherein each said clamp is substantially J-shaped and is dimensioned so that the curved portion thereof may be hooked to the underside of a top portion of a pickup truck bed.

8. The improved camper shell of claim 1 wherein said cover further comprises a window positioned so that when said cover is fitted over said collapsible frame, said window is located on a passenger side of said pickup truck.

9. The improved camper shell of claim 1 wherein said cover has a trapezoidal shape.

10. The improved camper shell of claim 1 wherein said cover has two long sides and two short sides, and further comprising a cord positioned along each of said long sides, so that when said first edge of said cover is interposed between said first bottom support and said top of said pickup truck bed and when said second edge of said cover is interposed between said second bottom support and said top of said pickup truck bed, said cord is located in an interior of said camper shell.

11. The improved camper shell of claim 1 wherein said shell frame has a downward taper from a rear portion thereof to a forward portion thereof.

12. The improved camper shell of claim 1 further comprising at least two supplemental vertical members, each of which is interposed between one said bottom horizontal support and one said horizontal support.

13. The improved camper shell of claim 1 wherein said shell frame is substantially comprised of steel.

14. An improved camper shell apparatus comprising, in combination:
   a collapsible frame;
   wherein said collapsible frame comprises:
      a first bottom frame component adapted to be positioned on top of a first long side of a pickup truck bed;
      a second bottom frame component adapted to be positioned on top of a second long side of a pickup truck bed;
      wherein each of said first bottom frame component and said second bottom frame component has an adjustable length;
      a first rear vertical support coupled at a first end thereof to said first bottom frame component;
      a second rear vertical support coupled at a first end thereof to said second bottom frame component;
      a first center vertical support coupled at a first end thereof to said first bottom frame component;
      a second center vertical support coupled at a first end thereof to said second bottom frame component;
      a first forward vertical support coupled at a first end thereof to said first bottom frame component;
      a second forward vertical support coupled at a first end thereof to said second bottom frame component;
      a rear cross-member having at each of a first end and a second end thereof at least a forward projection and a downward projection;
      a center cross-member having at each of a first end and a second end thereof a forward projection, a rearward projection, and a downward projection;
      a forward cross-member having at each of a first end and a second end thereof a rearward projection and a downward projection;
      wherein each of said rear cross-member, said center cross-member, and said forward cross-member has an adjustable length;
      a first horizontal support coupling between said forward projection on said first end of said rear cross member and said rearward projection on said first end of said center cross-member;
      a second horizontal support coupling between said forward projection on said first end of said center cross-member and said rearward projection on said first end of said forward cross-member;
      a third horizontal support coupled between said forward projection on said second end of said rear cross member and said rearward projection on said second end of said center cross-member;
      a fourth horizontal support coupling between said forward projection on said second end of said center cross-member and said rearward projection on said second end of said forward cross-member;
      for each said rear, center and forward vertical support, a clamp joining said vertical support to a bed of a pickup truck; and
   a cover adapted to be fitted over said collapsible frame;
   wherein a first edge of said cover is adapted to be interposed between said first bottom support and said top of said pickup truck bed; and
   wherein a second edge of said cover is adapted to be interposed between said second bottom support and said top of said pickup truck bed.

15. The improved camper shell of claim 14 wherein said rear cross-member further comprises at each of said first end and said second end a rearward projection and further comprising first and second rear supports, each of which is adapted to be coupled to one said rearward projection and to one said bottom horizontal support.

16. The improved camper shell of claim 14 wherein:
   said rear cross-member further comprises at substantially a center point thereof a forward projection;
   said center cross-member further comprises at substantially a center point thereof a forward projection and, opposite thereto, a rearward projection; and
   said forward cross-member further comprises at substantially a center point thereof a rearward projection.

17. The improved camper shell of claim 16 further comprising:
   a fifth horizontal support adapted to couple between said forward projection located substantially at said center point of said rear cross-member and said rearward projection located substantially at said center point of said center cross-member; and
   a sixth horizontal support adapted to couple between said forward projection located substantially at said center point of said center cross-member and said rearward projection located substantially at said center point of said forward cross-member.

18. The improved camper shell of claim 14 wherein said cover has a trapezoidal shape.

19. The improved camper shell of claim 14 wherein said shell frame has a downward taper from a rear portion thereof to a forward portion thereof.

20. An improved camper shell apparatus comprising, in combination:

a collapsible frame;

wherein said collapsible frame comprises:

a first bottom frame component adapted to be positioned on top of a first long side of a pickup truck bed;

a second bottom frame component adapted to be positioned on top of a second long side of a pickup truck bed;

wherein each of said first bottom frame component and said second bottom frame component has an adjustable length;

a first rear vertical support coupled at a first end thereof to said first bottom frame component;

a second rear vertical support coupled at a first end thereof to said second bottom frame component;

a first center vertical support coupled at a first end thereof to said first bottom frame component;

a second center vertical support coupled at a first end thereof to said second bottom frame component;

a first forward vertical support coupled at a first end thereof to said first bottom frame component;

a second forward vertical support coupled at a first end thereof to said second bottom frame component;

a rear cross-member having at each of a first end and a second end thereof at least a forward projection and a downward projection;

wherein said rear cross-member further comprises at each of said first end and said second end a rearward projection and further comprising first and second rear supports, each of which is adapted to be coupled to one said rearward projection and to one said bottom horizontal support;

a center cross-member having at each of a first end and a second end thereof a forward projection, a rearward projection, and a downward projection;

a forward cross-member having at each of a first end and a second end thereof a rearward projection and a downward projection;

wherein each of said rear cross-member, said center cross-member, and said forward cross-member has an adjustable length;

said rear cross-member further comprises at substantially a center point thereof a forward projection;

said center cross-member further comprises at substantially a center point thereof a forward projection and, opposite thereto, a rearward projection;

said forward cross-member further comprises at substantially a center point thereof a rearward projection;

a first horizontal support coupling between said forward projection on said first end of said rear cross member and said rearward projection on said first end of said center cross-member;

a second horizontal support coupling between said forward projection on said first end of said center cross-member and said rearward projection on said first end of said forward cross-member;

a third horizontal support coupled between said forward projection on said second end of said rear cross member and said rearward projection on said second end of said center cross-member;

a fourth horizontal support coupling between said forward projection on said second end of said center cross-member and said rearward projection on said second end of said forward cross-member;

a fifth horizontal support adapted to couple between said forward projection located substantially at said center point of said rear cross-member and said rearward projection located substantially at said center point of said center cross-member; and a sixth horizontal support adapted to couple between said forward projection located substantially at said center point of said center cross-member and said rearward projection located substantially at said center point of said forward cross-member;

for each said rear, center and forward vertical support, a clamp joining said vertical support to a bed of a pickup truck; and wherein said shell frame has a downward taper from a rear portion thereof to a forward portion thereof; and a cover adapted to be fitted over said collapsible frame;

wherein said cover has a trapezoidal shape;

wherein a first edge of said cover is adapted to be interposed between said first bottom support and said top of said pickup truck bed; and wherein a second edge of said cover is adapted to be interposed between said second bottom support and said top of said pickup truck bed.

* * * * *